United States Patent [19]
Linsley

[11] Patent Number: 5,583,894
[45] Date of Patent: Dec. 10, 1996

[54] SLIP BUFFER FOR SYNCHRONIZING DATA TRANSFER BETWEEN TWO DEVICES

[75] Inventor: Charles E. Linsley, San Jose, Calif.

[73] Assignee: VLSI Technology, Inc., San Jose, Calif.

[21] Appl. No.: 407,225

[22] Filed: Mar. 20, 1995

[51] Int. Cl.$^6$ ............................. H04L 7/00; H04L 7/04; H04L 7/06
[52] U.S. Cl. .................... 375/372; 375/371; 375/363; 370/504; 370/528; 364/239.1; 364/239.51
[58] Field of Search ........................ 375/371, 372, 375/363, 364, 354; 370/100.1, 101, 102, 105.1, 105.3, 111; 364/239.1, 239.3, 239.5, 239.51; 395/250, 400, 425

[56] References Cited

U.S. PATENT DOCUMENTS

| | | | |
|---|---|---|---|
| 4,171,538 | 10/1979 | Sheller | 364/900 |
| 4,878,219 | 10/1989 | Kaufman et al. | 370/97 |
| 4,941,156 | 7/1990 | Stern et al. | 375/372 |
| 4,945,548 | 7/1990 | Iannarone | 375/214 |
| 5,119,406 | 6/1992 | Kramer | 375/372 |
| 5,297,145 | 3/1994 | Havermans | 370/100.1 |
| 5,311,511 | 5/1994 | Reilly et al. | 375/372 X |
| 5,323,426 | 6/1994 | James et al. | 375/372 |
| 5,359,605 | 10/1994 | Urbansky et al. | 375/372 X |
| 5,459,782 | 10/1995 | Volejnik | 375/372 |

OTHER PUBLICATIONS

Product Preview DS2143/DS2143Q, Dallas Semiconductor, E1 Controller (Undated datasheet representing a preliminary engineering design).

Primary Examiner—Stephen Chin
Assistant Examiner—Bryan Webster
Attorney, Agent, or Firm—Douglas L. Weller

[57] ABSTRACT

A slip buffer includes a first-in-first-out memory, an input address generating means, an output address generating means, and a slip buffer control logic. The input address generating means generates addresses into which data is read into the first-in-first-out memory. The output address generating means generates addresses from which data is read from the first-in-first-out memory. The slip buffer control logic includes a first latch, a second latch and a slip address generation means. A first boundary address of a first frame boundary is stored in the first latch. The first latch includes a first validity bit which indicates whether the first boundary address is valid. A second boundary address of a second frame boundary is stored in the second latch. The second latch includes a second validity bit which indicates whether the second boundary address is valid. The slip address generation means loads a first new output address into the output address generating means when a current input address in the input address generating means is about to overtake a current output address in the output address generating means. The first new output address is a full frame ahead of the current output address in the output address generating means. The slip address generation means also loads a second new output address into the output address generating means when the current output address is about to overtake the current input address. The second new output address is a full frame behind the current output address in the output address generating means.

24 Claims, 5 Drawing Sheets

SLIP BUFFER FOR SYNCHRONIZING DATA TRANSFER BETWEEN TWO DEVICES

BACKGROUND

The present invention concerns data transfer between devices and particularly a slip buffer used for synchronizing data transfer between two devices.

Data exchange between devices generally requires at least one device to transmit the data and at least one device to receive the data. In one common method of data transmission, the transmitting device uses a clock signal in the transmission of the data. This transmission clock signal is recovered by the receiving device and used by the receiving device to capture the data signal. The data, once recovered is processed by the receiving device in synchronization to an internal dock of the receiving device.

When the transmission clock signal has a frequency which is the same as the frequency of the internal clock used by the receiving device to process the data, data transmission and reception can proceed smoothly. However, often the transmission clock signal will vary slightly from the internal clock of the receiving device. In this case, it is necessary to provide some means of synchronizing the transfer of data. Otherwise, data will be lost when the receiving device cannot process the data as fast as the transmitting device is sending it, or incorrect data will be processed because the transmitting device cannot send data as fast as data is processed.

In order to allow for variations in frequency between the transmission clock signal and the internal clock signal of a receiving device, a slip buffer may be used by the receiving device. When the receiving device cannot process the data as fast as the transmitting device is sending it, the slip data buffer will discard some of the data that is sent. When the transmitting device cannot send data as fast as data is processed by the receiving device, the slip buffer will repeat previous data to allow the slower transmitting device to catch up. The slip buffer performs these events in a controlled manner and issues a notification when a slip has occurred.

In order to design a versatile and effective slip buffer, several obstacles need to be overcome. For example, when the data transmitted is organized into blocks it is desirable to take into account the boundaries of data blocks and to take these boundaries into account when a slip takes place.

SUMMARY OF THE INVENTION

In accordance with the preferred embodiment of the present invention, a slip buffer is provided. The slip buffer includes a first-in-first-out memory, an input address generating means, an output address generating means, and a slip buffer control logic. The input address generating means generates addresses into which data is read into the first-in-first-out memory. For example, the input address generating means is an input address counter clocked by an input clock signal. The output address generating means generates addresses from which data is read from the first-in-first-out memory. For example, the output address generating means is an output address counter clocked by an output clock signal.

The slip buffer control logic includes a first latch, a second latch and a slip address generation means. A first boundary address of a first frame boundary is stored in the first latch. The first latch includes a first validity bit which indicates whether the first boundary address is valid. A second boundary address of a second frame boundary is stored in the second latch. The second latch includes a second validity bit which indicates whether the second boundary address is valid. In general, the number of boundary address latches is arbitrary. The number of boundary address latches is generally at least two and should be equal to the number of blocks held by the first-in-first-out memory.

The slip address generation means loads a first new output address into the output address generating means when a current input address in the input address generating means is about to overtake a current output address in the output address generating means. The first new output address is a full frame ahead of the current output address in the output address generating means. The slip address generation means also loads a second new output address into the output address generating means when the current output address is about to overtake the current input address. The second new output address is a full frame behind the current output address in the output address generating means.

When the current input address is about to overtake the current output address, and either the first boundary address in the first latch or the second boundary address in the second latch is valid, the new address is loaded in the output address generating means when the current output address in the output address generating means is at a frame boundary. When the current output address is about to overtake the current input address, and either the first boundary address in the first latch or the second boundary address in the second latch is valid, the new address is loaded in the output address generating means when the current output address in the output address generating means is at a frame boundary.

When the current input address is about to overtake the current output address, and both the first boundary address in the first latch and the second boundary address in the second latch are not valid, the new address is immediately loaded in the output address generating means. When the current output address is about to overtake the current input address, and both the first boundary address in the first latch and the second bound address in the second latch are not valid, the new address is immediately loaded in the output address generating means.

In the preferred embodiment of the present invention, the slip buffer control logic additionally includes a frame boundary signal means. The frame boundary signal means generates a frame boundary signal when the first boundary address in the first latch is valid and equals the current output address in the output address generating means. Additionally, the frame boundary signal means generates a frame boundary signal when the second boundary address in the second latch is valid and equals the current output address in the output address generating means.

In the preferred embodiment of the present invention, the slip address means includes comparison logic. The comparison logic compares the current output address and the current input address. The comparison logic indicates that the current input address is about to overtake the current output address when the current input address is one less than the current output address. The comparison logic indicates that the current output address is about to overtake the current input address when the current output address is one less than the current input address. In an alternate embodiment, the comparison logic indicates that the current input address is about to overtake the current output address when the current input address is equal to the current output address.

In one preferred embodiment of the present invention, the first-in-first-out memory contains two frames of data and the new address is loaded into the output address generating means by toggling the current output address in the output address generating means. Also in a preferred embodiment, serial to parallel logic converts a serial input signal to a parallel bit data word for placement in the first-in-first-out memory. The serial to parallel logic is clocked by the input clock signal. Likewise, a parallel to serial logic converts a parallel bit data word from the first-in-first-out memory into a serial output signal. The parallel to serial logic is clocked by the output clock signal.

Also, in one embodiment of the present invention, the slip buffer control logic additionally includes a third latch, a fourth latch and a multi-frame boundary signal means. The third latch includes a third validity bit which indicates whether the third address is valid. In systems where the multi-frame boundaries do not fall on the frame boundaries, a boundary address of a first multi-frame boundary can be stored in the third latch. In systems where the multi-frame boundaries do fall on the frame boundaries the address is the frame boundary stored in the first latch. The fourth latch includes a fourth validity bit which indicates whether the fourth boundary address is valid. In systems where the multi-frame boundaries do not fall on the frame boundaries, a boundary address of a second multi-frame boundary can be stored in the fourth latch. In systems where the multi-frame boundaries do fall on the frame boundaries the address is the frame boundary stored in the second latch. The multi-frame boundary signal means generates a multi-frame boundary signal when the third boundary address in the third latch is valid and equals the current output address in the output address generating means. Additionally, the multi-frame boundary signal means generates a multi-frame boundary signal when the fourth boundary address in the fourth latch is valid and equals the current output address in the output address generating means.

In the preferred embodiment of the present invention, when the slip buffer control logic receives a force to boundary signal and the first boundary address and the second boundary address are valid, and the output address is not already equal to either the first boundary address or the second boundary address, the slip address generation means loads into the output address generating means one of the first boundary address and the second boundary address which is furthest from the current output address. If only one of the boundary addresses is valid, the valid boundary address is loaded into the output address generating means. If neither of the boundary addresses is valid, the output address generating means progresses as though the slip buffer had not received a force to boundary signal, since there is no known boundary to which the output address may be forced.

The present invention provides for several advantages over prior art slip buffers. For example, the present invention allows for arbitrary slips when block boundaries are not known. The preferred embodiment allows for an efficient method to keep track of block boundaries. Also the preferred embodiment provides for an efficient manner of determining where and which block boundaries to align to when an align signal is received.

DESCRIPTION OF THE PREFERRED EMBODIMENT

Figure 1:
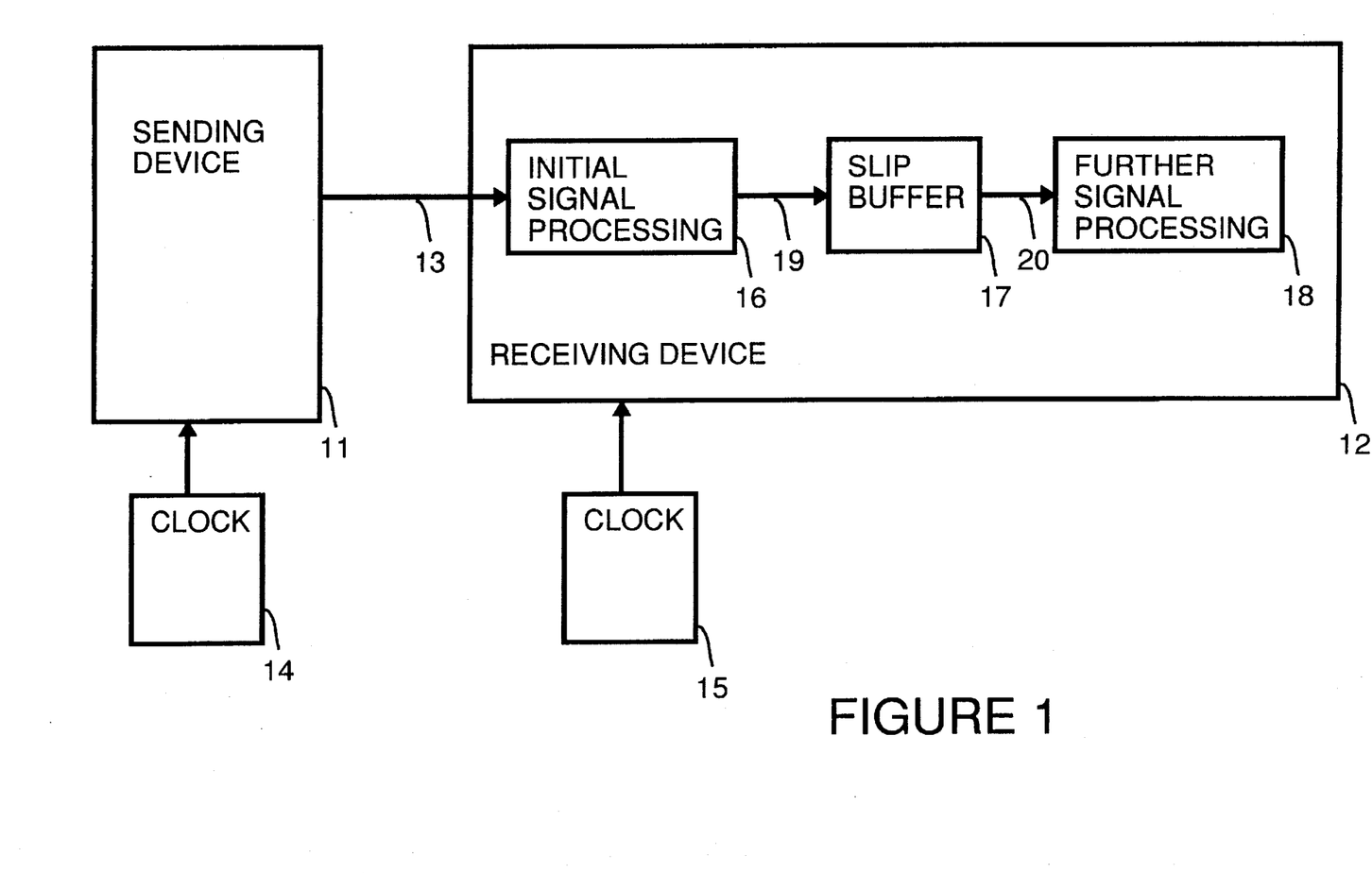
FIG. 1 shows a simplified block diagram of a system in which a transmitting device transmits data to a receiving device in accordance with a preferred embodiment of the present invention.

FIG. 1 shows a simplified block diagram of a system in which a transmitting device 11 transmits data over a channel 13 to a receiving device 12. Sending device 11 transmits data utilizing a clock 14 which operates at a first frequency. Receiving device 12 processes data using a clock 15, operating at a second frequency, which is approximately, but not necessarily exactly, equal to the first frequency.

Data received by receiving device 12 over data channel 13 is received by initial signal processing logic 16. Initial signal processing logic 16 performs initial processing of the data received from data channel 13. For example, initial signal processing logic 16 extracts the clock 14 from the data transmitted over data channel 13. In addition, initial signal processing logic 16 extracts the boundaries of data frames and multi-frames. Initial signal processing logic 16 forwards the data stream to a slip buffer 17 through a data channel 19. Slip buffer 19 receives data through data channel 19 in synchronization with clock 14. After buffering the data in a first-in-first-out (FIFO) memory, slip buffer 17 forwards the data through data channel 20 to be further processed by signal processing logic 18. The rate of data flow through data channel 20 is controlled by clock 15. When the frequency of clock 14 is slower than clock 15, slip buffer 17 "slips" by re-sending a frame of data. When the frequency of clock 14 is faster than clock 15, slip buffer 17 "slips" by discarding a frame of data.

Figure 2:
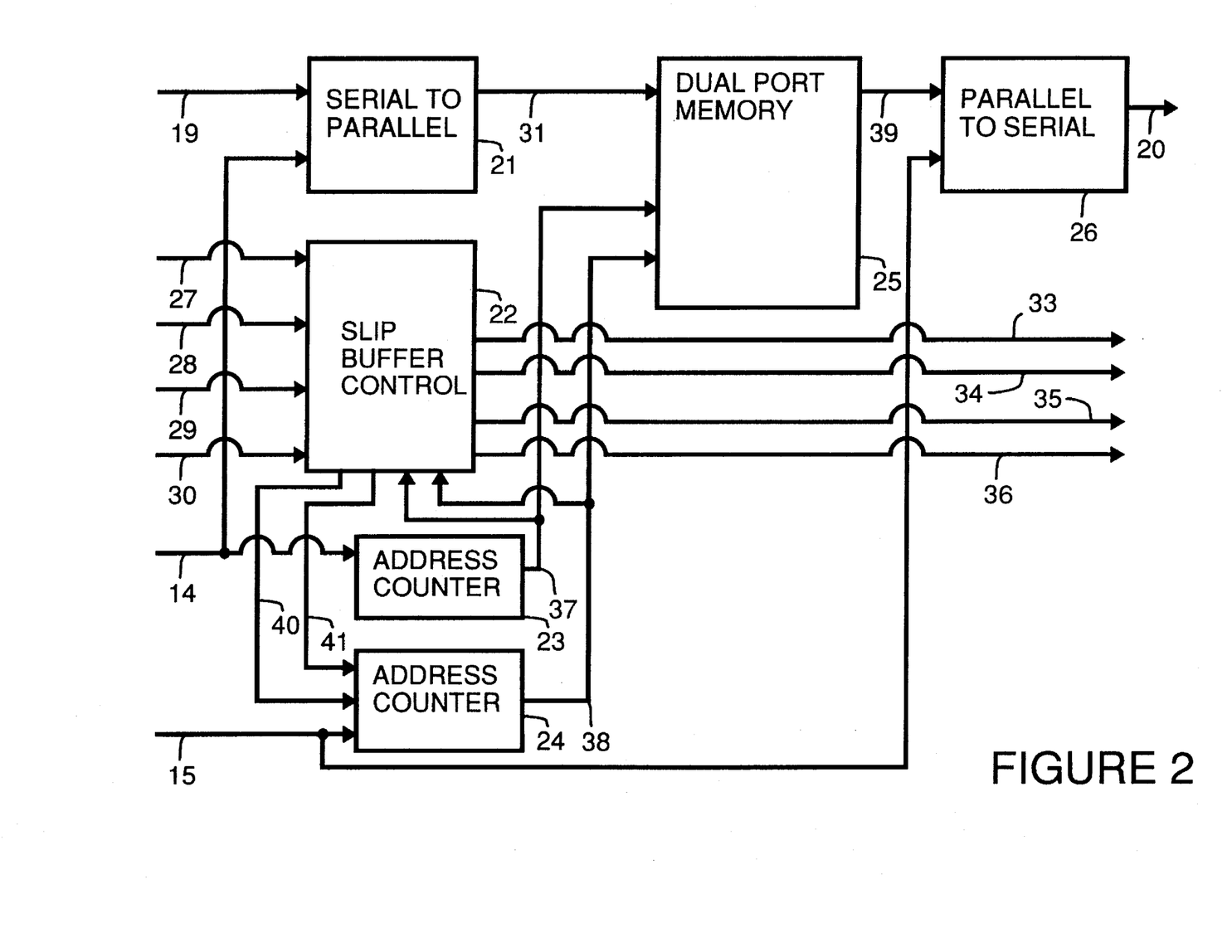
FIG. 2 shows a block diagram of a slip buffer within the receiving device shown in FIG. 1 in accordance with a preferred embodiment of the present invention.

FIG. 2 shows a block diagram of slip buffer 17. Serial to parallel logic 21 receives a serial data stream from initial signal processing logic 16 on a data channel 19. Additionally, serial to parallel logic 21 receives extracted clock signal 14 from initial signal processing logic 16. Serial to parallel logic 21 converts the serial data stream from data channel 19 to an eight-bit wide data words which are stored via lines 31 into a dual port memory 25. Dual port memory 25 operates as a FIFO memory. The storage address for data from serial to parallel logic 21 is placed on address lines 37 by an address counter 23. Address counter 23 generates addresses in synchronization with clock 14.

Dual port memory 25 forwards data words via data lines 39 to parallel to serial logic 26. The retrieval address for data words retrieved from dual port memory 25 forwarded to parallel to serial logic 26 is placed on address lines 38 by an address counter 24. Address counter 24 generates addresses in synchronization with clock 15.

Slip buffer control logic 22 contains the logic which controls "slipping" of data within slip buffer 17. Slip buffer control logic 22 receives from initial signal processing logic 16 a multi-frame boundary signal on a line 28 and a frame boundary signal on a line 29. Initial signal processing logic 16 additionally places a "frame known" control signal of on line 27 which indicates whether the multi-frame boundary signal on line 28 and the frame boundary signal on line 29 are valid. When the frame known control signal on line 27 is invalid, this indicates that initial signal processing logic 16 has not yet determined the location of frame and multi-frame boundaries in the data stream received from sending device 13. When the frame known control signal on line 27 is valid, this indicates that the multi-frame boundary signal on line 28 will be asserted when data transmitted through data channel 19 to serial to parallel logic 21 is at a multi-frame boundary. Also, when the frame known control signal on line 27 is valid this indicates that the frame boundary signal on line 29 will be asserted when data transmitted through data channel 19 to serial to parallel logic 21 is at a frame boundary. In one preferred embodiment, all multi-frame boundaries occur on frame boundaries.

In addition, slip buffer control logic 22 receives a "force to boundary" signal from receiving device 13 on a line 30. The force to boundary signal is used by receiving device 13 to synchronize on a frame boundary for further processing by signal processing logic 18. The force to boundary signal is asserted, for example, during reset of receiving device 12.

In one embodiment of the present invention, slip buffer control logic 22 produces slips by loading a slip address into address lines 40 and asserting a load signal 41. Upon assertion of load signal 41, address counter 24 loads the address on address lines 20 as the current address within address counter 24.

Slip buffer control logic 22 generates a multi-frame boundary signal on a line 33 which indicates when data output by parallel to serial logic 26 on data channel 20 is at a multi-frame boundary. Slip buffer control logic 22 also generates a frame boundary signal on a line 34 which indicates when data output by parallel to serial logic 26 on data channel 20 is at a frame boundary. Slip buffer control logic 22 also generates a slip signal on a line 35 which indicates the occurrence of a slip on data output by parallel to serial logic 26 on data channel 20. Slip buffer control logic 22 also generates a slip direction signal on a line 36 which, when there is a slip, indicates the direction of the slip on data output by parallel to serial logic 26 on data channel 20.

Figure 3:
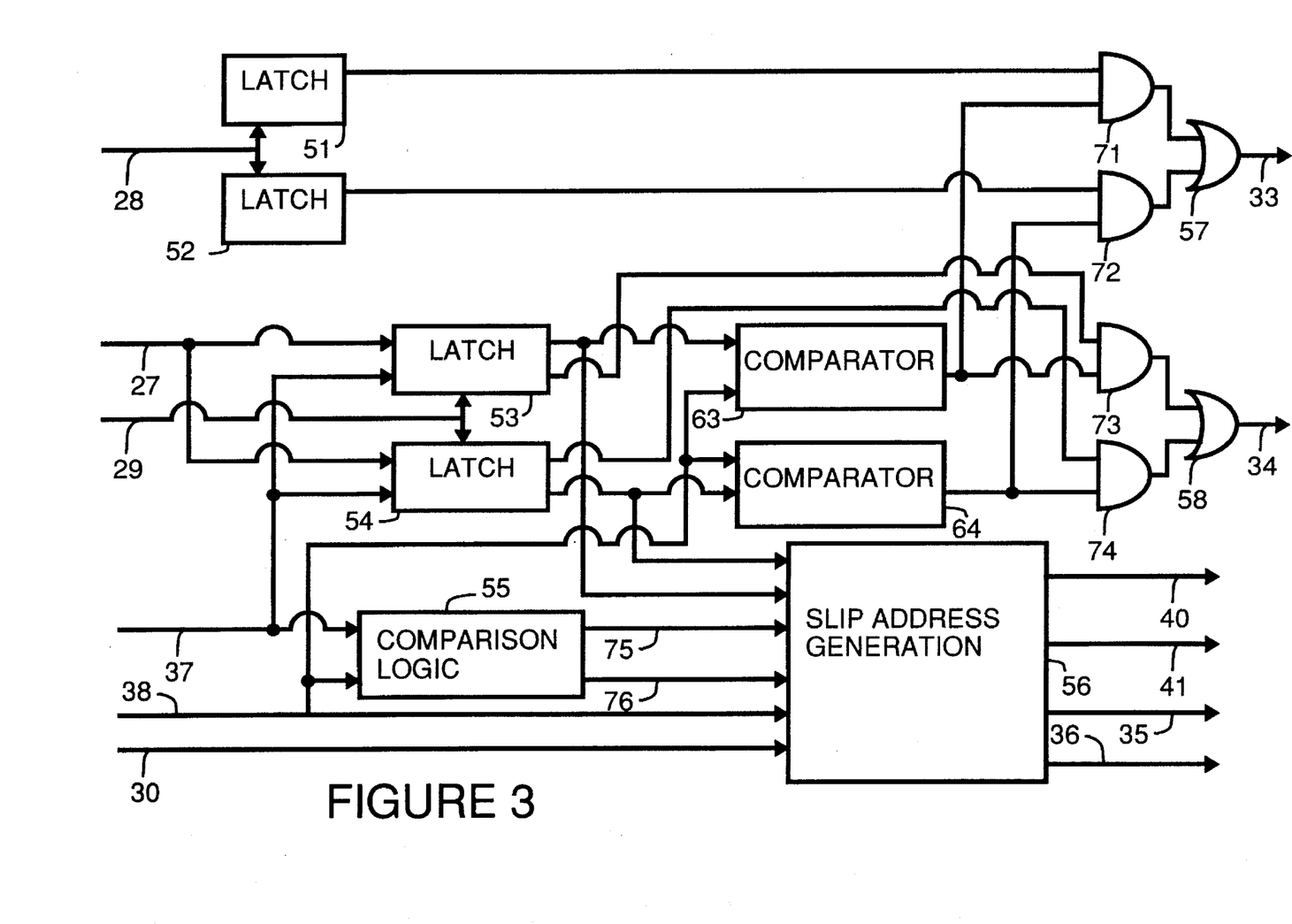
FIG. 3 shows a block diagram of control logic within the slip buffer shown in FIG. 2 in accordance with a preferred embodiment of the present invention.

FIG. 3 shows a block diagram of slip buffer control logic 22 in accordance with a preferred embodiment of the present invention. A latch 53 and a latch 54 are used to store the address of frame buffer boundaries. Each of latches 53 and 54 are ten bits wide. Nine bits store the address of a frame buffer boundary. The remaining bit is used to indicate whether the boundary address stored within the latch is valid. When the frame boundary signal on line 29 is asserted and the frame known control signal on line 27 is valid, alternately, either latch 53 or latch 54 will load the address on address lines 37 and the address valid bit used to indicate whether the boundary address stored within the latch is valid will be set to logic 1. If the frame known control signal on line 27 becomes invalid all address valid bits within both latch 53 and latch 54 are immediately cleared.

A latch 51 is used to store a valid bit which indicates whether the frame boundary stored in latch 53 is a multi-frame boundary. A latch 52 is used to store a valid bit which indicates whether the frame boundary stored in latch 54 is a multi-frame boundary. If the frame known control signal on line 27 becomes invalid all address valid bits within both latch 51 and latch 52 are immediately cleared.

Comparator 63 compares the address on address lines 38 with the value in latch 53. When the address on lines 38 is the same as the address stored in latch 53, and the additional bit in latch 53 indicates the boundary address stored within latch 53 is valid, comparator 63 asserts its output.

Comparator 64 compares the address on address lines 38 with the value in latch 54. When the address on lines 38 is the same as the address stored in latch 54, and the additional bit in latch 54 indicates the boundary address stored within latch 54 is valid, comparator 64 asserts its output.

A logic gate 71, a logic gate 72 and a logic gate 57, connected as shown, are used to generate the multi-frame boundary signal on line 33. When the output of comparator 63 is asserted and the valid bit in latch 51 indicates the frame boundary stored in latch 63 is a multi-frame boundary, logic OR gate 57 asserts the multi-frame boundary signal on line 33. Also, when the output of comparator 64 is asserted and the valid bit in latch 52 indicates the frame boundary stored in latch 64 is a multi-frame boundary, logic OR gate 57 asserts the multi-frame boundary signal on line 33.

A logic gate 73, a logic gate 74 and a logic gate 58, connected as shown, are used to generate the frame boundary signal on line 34. When the output of comparator 63 is asserted and the valid bit in latch 53 indicates the frame boundary stored in latch 63 is a valid frame boundary, logic OR gate 58 asserts the frame boundary signal on line 34. Also, when the output of comparator 64 is asserted and the valid bit in latch 54 indicates the frame boundary stored in latch 64 is a valid frame boundary, logic OR gate 58 asserts the frame boundary signal on line 34.

Comparison logic compares the address on lines 37 with the address on lines 38 and generates a preliminary slip signal on line 75 and a preliminary slip direction signal on line 76. The address on lines 37 is the write address (W) at which data is currently being written to dual port memory 25. The address on lines 38 is the read address (R) at which data is currently being read from dual port memory 25.

When the write address minus the read address (W–R) equals 1, this indicates that read counter 24 is about to overtake write counter 23. That is, data is being read from dual port memory 25 faster than it is being written into dual port memory 25. Therefore, when this occurs, comparison logic 55 asserts the preliminary slip signal on line 75 and indicates by the preliminary slip direction signal on line 76 that the slip is backwards. That is, a block of data must be repeated.

When the write address minus the read address (W–R) equals minus one, this indicates that write counter 23 is about to overtake read counter 24. That is, data is being written into dual port memory 25 faster than it is being read from dual port memory 25. Therefore, when this occurs, comparison logic 55 asserts the preliminary slip signal on line 75 and indicates by the preliminary slip direction signal on line 76 that the slip is forwards. That is, a block of data must be skipped.

Alternately, when write counter 23 is about to overtake read counter 24, comparison logic may delay asserting the preliminary slip signal on line 75 until the write address minus the read address (W–R) equals zero. This may be done when the dual port memory is wider than the received data unit. In this case, when the write address minus the read address (W–R) equals zero, this indicates that write counter 23 is about to overtake read counter 24. That is, data is being written into dual port memory 25 faster than it is being read from dual port memory 25. Therefore, when this occurs, comparison logic 55 asserts the preliminary slip signal on line 75 and indicates by the preliminary slip direction signal on line 76 that the slip is forward. That is, a block of data must be skipped.

In implementing the present invention, the unit of data ("data unit") being received on line 19 may be of arbitrary width. In the preferred embodiment, the data unit is one bit wide. The width of dual port memory 25 may be of any convenient multiple of the width of the data on line 19. In the preferred embodiment, the width of the data on line 19 is eight bits (i.e., eight data units). The overlap of the address counters in the preferred embodiment is possible without data corruptions because address counters 23 and 24 count data units. The most significant six bits of the data unit count is used as a dual port memory address to address memory locations in dual port memory 25. The least significant three bits refer to the data unit (bits) within each memory location. Address comparator 55 compares only the six-bits of the dual port memory addresses. Thus, comparator 55 will find an address difference between addresses in address counter 23 and address counter 24 of zero when input counter 23 is counting the first data unit within a particular eight bit word to be stored in dual port memory 25 and output counter 24 is counting a last data unit in a word currently stored in dual port memory 25 at the address to be written by input counter 23. There is no conflict because the new data is not written into dual port memory 25 until all the data units for the eight-bit word have been accumulated by serial to parallel logic 21. Thus, provided there are no pauses in clock 15, the output counter 24 will complete reading out the last unit of data in the eight-bit memory location before all the data units for the new eight-bit word is accumulated and written into the memory location. In embodiments of the present invention where the data unit is the same width as data words stored in dual memory port 25, address counter 23 and address counter 24 are not allowed to overlap. Additionally, in such cases, serial to parallel logic 21 and parallel to serial logic 26 are unnecessary.

Slip address generation logic 56 implements the slip. When the preliminary slip signal on line 75 is asserted, and preliminary slip direction signal 76 indicates that the slip is forward, then slip address generation logic 56 will check the contents of latch 53 and latch 54. If the values in latch 53 or latch 54 are valid, slip address generation logic 56 will delay executing the slip until a frame boundary (stored in latch 53 or latch 54) is about to be reached. Then slip address generation logic 56 will add a frame length to the address for the frame boundary and output this on address lines 40 as the slip address. At the same time, slip address generation logic 56 will assert the load signal on line 41, will assert the slip signal on line 35 and will indicate by the slip direction signal on line 36 that the slip is forward.

If neither of the values in latch 53 or latch 54 are valid, slip address generation logic 56 will immediately execute the slip. Then slip address generation logic 56 will add a frame length to address lines 38 and output this on address lines 40 as the slip address. At the same time, slip address generation logic 56 asserts the load signal on line 41, asserts the slip signal on line 35 and indicates by the slip direction signal on line 36 that the slip is forward.

When the preliminary slip signal on line 75 is asserted, and preliminary slip direction signal 76 indicates that the slip is backwards, then slip address generation logic 56 will check the contents of latch 53 and latch 54. If either of the values in latch 53 or latch 54 are valid, slip address generation logic 56 will delay executing the slip until a frame boundary (stored in latch 53 or latch 54) is about to be reached. Then slip address generation logic 56 will subtract a frame length from the address for the frame boundary and output this on address lines 40 as the slip address. At the same time, slip address generation logic 56 asserts the load signal on line 41, asserts the slip signal on line 35 and indicates by the slip direction signal on line 36 that the slip is backwards.

If neither of the values in latch 53 or latch 54 are valid, slip address generation logic 56 will immediately execute the slip. Then slip address generation logic 56 will subtract a frame length from the address on address lines 38 and output this on address lines 40 as the slip address. At the same time, slip address generation logic 56 will assert the load signal on line 41, will assert the slip signal on line 35 and will indicate by the slip direction signal on line 36 that the slip is backwards.

Slip address generation 56 also responds to the assertion of the force to boundary signal on line 30. When slip address generation 56 receives the force to boundary signal on line 30, slip address generation 56 checks to determine whether the addresses in latch 53 and latch 54 are valid. If they are valid, slip address logic 56 loads into address counter 24 the address in latch 53 or latch 54 which is furthest from the address on address lines 38.

Figure 4:
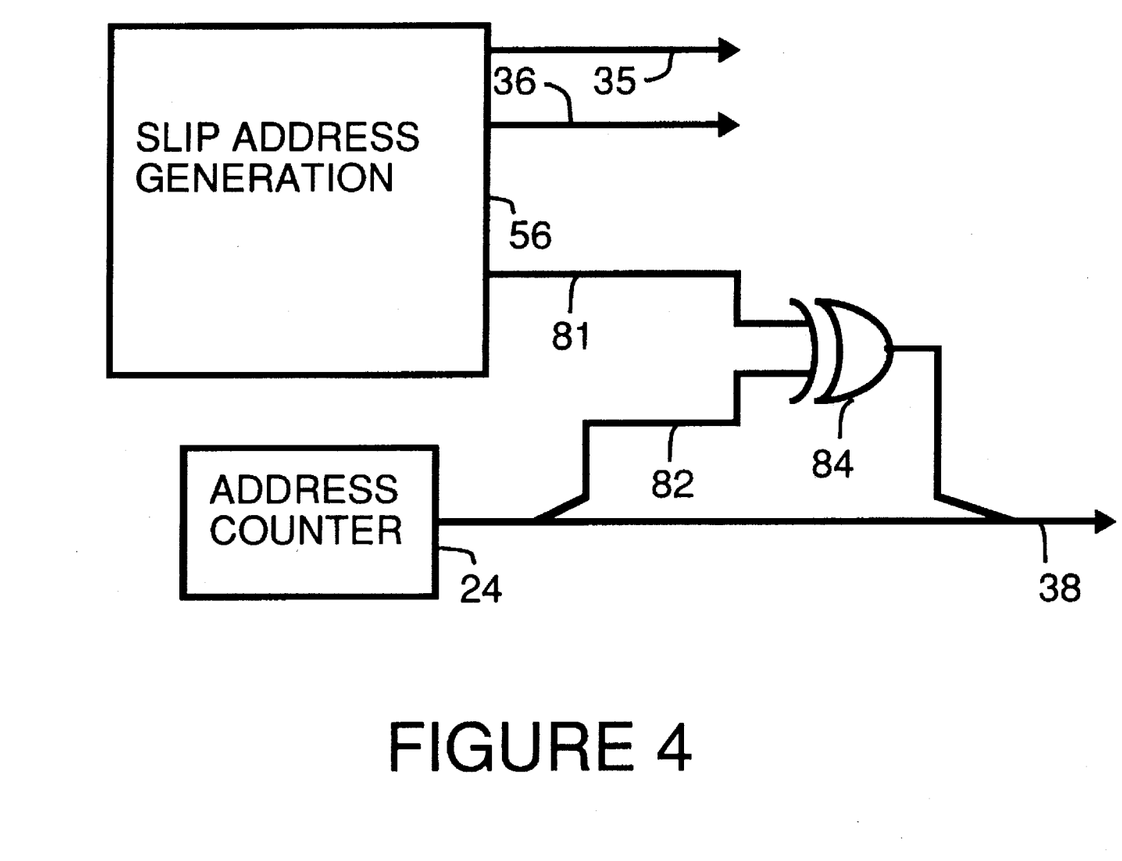
FIG. 4 illustrates a change to the control logic shown in FIG. 3 in accordance with an alternate preferred embodiment of the present invention.

FIG. 4 shows how, in a particular implementation of the present invention, the functionality of slip address generated on address lines 40 and the load signal 41 may be implemented instead by a simple toggle signal on a line 81 for the occurrence of a slip. That is, when dual port memory 39 has storage space to store exactly two data frames, and the frame length is exactly a power of two, a data slip, in either direction, may be accomplished by toggling the high order bit of the address on lines 38. This may be done, for example by placing the high order bit on a line 82 and utilizing a logic exclusive OR gate 84 as shown in FIG. 4. In this embodiment, address lines 40 and load line 41 are still use for the force to frame boundary function.

Figure 5:
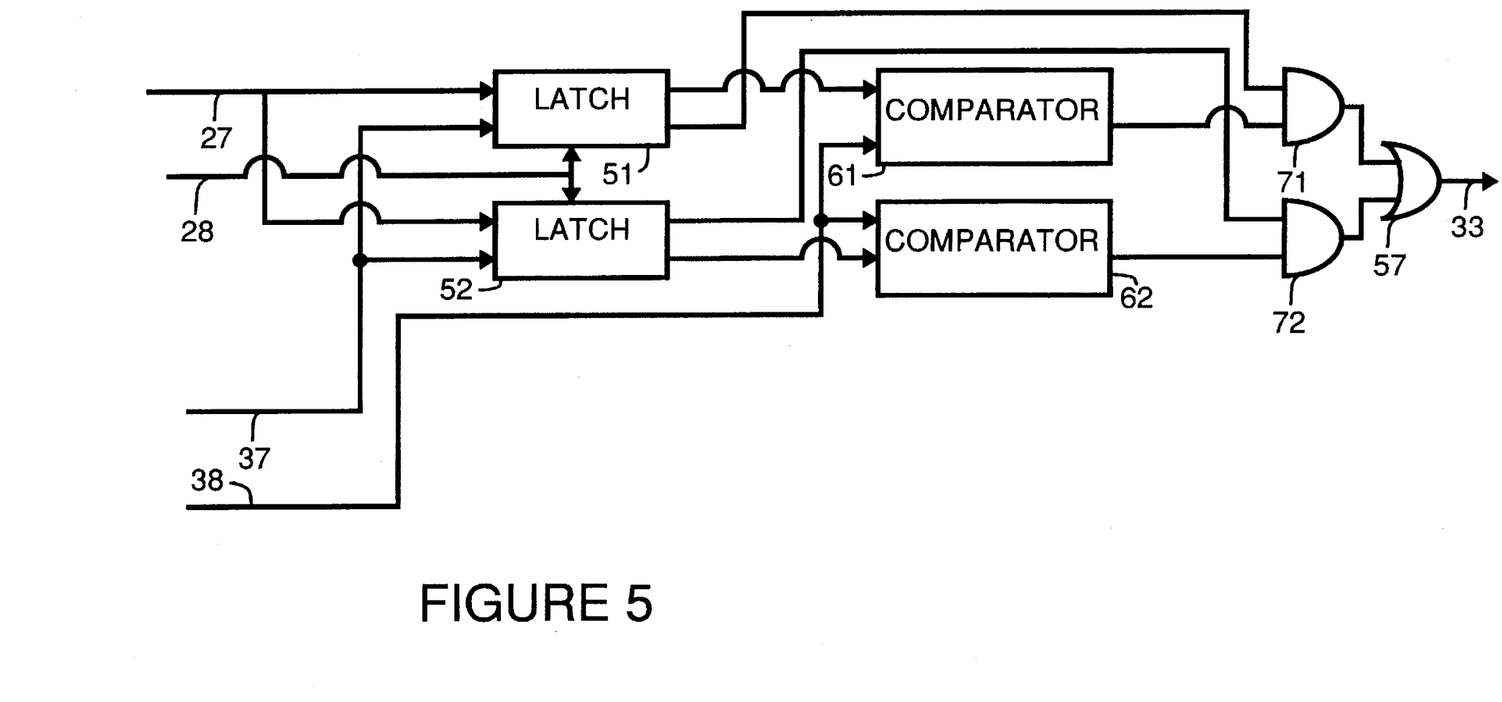
FIG. 5 shows a partial block diagram of control logic within the slip buffer shown in FIG. 2 in accordance with an alternate preferred embodiment of the present invention.

In systems where the multi-frame boundaries do fall on the frame boundaries, latches 51 and 52 may be expanded to store the address of multi-frame boundaries. For example, FIG. 5 shows the relevant part of slip buffer control logic 22 in accordance with this alternate preferred embodiment of the present invention. Each of latches 51 and 52 are ten bits wide. Nine bits store the address of a multi-frame buffer boundary. The remaining bit is used to indicate whether the multi-frame buffer boundary address stored within the latch is valid. When the multi-frame boundary signal on a line 28 is asserted and the frame known control signal on line 27 is valid, alternately, either latch 51 or latch 52 will load the address on address lines 37 and the address valid bit used to indicate whether the boundary address stored within the latch is valid will be set to logic 1. If the frame known control signal on line 27 becomes invalid all address valid bits within both latch 51 and latch 52 are immediately cleared.

A comparator 61 compares the address on address lines 38 with the value in latch 51. When the address on lines 38 is the same as the address stored in latch 51, and the additional bit in latch 51 indicates the multi-frame boundary address stored within latch 51 is valid, comparator 61 asserts its output.

Comparator 62 compares the address on address lines 38 with the value in latch 52. When the address on lines 38 is the same as the address stored in latch 52, and the additional bit in latch 52 indicates the multi-frame boundary address stored within latch 52 is valid, comparator 62 asserts its output.

Logic gate 71, logic gate 72 and logic gate 57, connected as shown, are used to generate the multi-frame boundary signal on line 33. When the output of comparator 61 is asserted and the valid bit in latch 51 indicates the frame boundary stored in latch 61 is a multi-frame boundary, logic OR gate 57 asserts the multi-frame boundary signal on line 33. Also, when the output of comparator 62 is asserted and the valid bit in latch 52 indicates the frame boundary stored in latch 62 is a multi-frame boundary, logic OR gate 57 asserts the multi-frame boundary signal on line 33.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A slip buffer comprising:

a first-in-first-out memory;

an input address generating means, coupled to the first-in-first-out memory, for generating addresses into which data is read into the first-in-first-out memory;

an output address generating means, coupled to the first-in-first-out memory, for generating addresses from which data is read from the first-in-first-out memory; and, a slip buffer control logic, coupled to the output address generating means, including a first latch into which is stored a first boundary address of a first frame boundary, the first latch including a first validity bit which indicates whether the first boundary address is valid, a second latch into which is stored a second boundary address of a second frame boundary, the second latch including a second validity bit which indicates whether the second boundary address is valid, and slip address generation means, coupled to the first latch and the second latch, for loading a first new output address into the output address generating means when a current input address in the input address generating means is about to overtake a current output address in the output address generating means, the first new output address being a full frame ahead of the current output address in the output address generating means, the slip address generation means also being for loading a second new output address into the output address generating means when the current output address is about to overtake the current input address, the second new output address being a full frame behind the current output address in the output address generating means.

2. A slip buffer as in claim 1:

wherein when the current input address is about to overtake the current output address, and at least one of the first boundary address in the first latch and the second boundary address in the second latch is valid, the first new address is loaded in the output address generating means when the current output address in the output address generating means is at a frame boundary; and, wherein when the current output address is about to overtake the current input address, and at least one of the first boundary address in the first latch and the second boundary address in the second latch is valid, the second new address is loaded in the output address generating means when the current output address in the output address generating means is at a frame boundary.

3. A slip buffer as in claim 2:

wherein when the current input address is about to overtake the current output address, and both the first boundary address in the first latch and the second boundary address in the second latch are not valid, the first new address is immediately loaded in the output address generating means; and, wherein when the current output address is about to overtake the current input address, and both the first boundary address in the first latch and the second bound address in the second latch are not valid, the second new address is immediately loaded in the output address generating means.

4. A slip buffer as in claim 3 wherein the first-in-first-out memory contains two frames of data and the first new address and the second new address are loaded into the output address generating means by toggling a bit in the current output address in the output address generating means.

5. A slip buffer as in claim 1 wherein the first-in-first-out memory contains two frames of data and the first new address and the second new address are loaded into the output address generating means by toggling a bit in the current output address in the output address generating means.

6. A slip buffer as in claim 1 wherein:

the input address generating means is an input address counter clocked by an input clock signal; and, wherein the output address generating means is an output address counter clocked by an output clock signal.

7. A slip buffer as in claim 6 additionally comprising:

serial to parallel logic, coupled to the first-in-first-out memory, which converts a serial input signal to a parallel bit data word for placement in the first-in-first-out memory, the serial to parallel logic being clocked by the input clock signal; and, parallel to serial logic, coupled to the first-in-first-out memory, which converts a parallel bit data word from the first-in-first-out memory into a serial output signal, the parallel to serial logic being clocked by the output clock signal.

8. A slip buffer as in claim 7 wherein the slip buffer control logic additionally includes:

frame boundary signal means, coupled to the first latch, the second latch and the output address generating means, for generating a frame boundary signal when the first boundary address in the first latch is valid and equals the current output address in the output address generating means, and for generating the frame boundary signal when the second boundary address in the second latch is valid and equals the current output address in the output address generating means.

9. A slip buffer as in claim 7 wherein the slip buffer control additionally comprises:

a third latch into which is stored a third validity bit which indicates whether the first boundary address is a valid multi-frame boundary address;

a fourth latch into which is stored a fourth validity bit which indicates whether the second boundary address is a valid multi-frame boundary address; and, multi-frame boundary signal means, coupled to the third latch, the fourth latch and the output address generating means, for generating a multi-frame boundary signal when the first boundary address in the first latch is valid multi-frame boundary address and equals the current output address in the output address generating means, and for generating the multi-frame boundary signal when the second boundary address in the second latch is a valid multi-frame boundary address and equals the current output address in the output address generating means.

10. A slip buffer as in claim 7 wherein the slip buffer control additionally comprises:

a third latch into which is stored a third boundary address and a third validity bit which indicates whether the third boundary address is a valid multi-frame boundary address;

a fourth latch into which is stored a fourth boundary address a fourth validity bit which indicates whether the fourth boundary address is a valid multi-frame boundary address; and, multi-frame boundary signal means, coupled to the third latch, the fourth latch and the output address generating means, for generating a multi-frame boundary signal when the third boundary address in the third latch is a valid multi-frame boundary address and equals the current output address in the output address generating means, and for generating the multi-frame boundary signal when the fourth boundary address in the fourth latch is a valid multi-frame boundary address and equals the current output address in the output address generating means.

11. A slip buffer as in claim 1 wherein the slip address means includes comparison logic, the comparison logic comparing the current output address and the current input address, the comparison logic indicating that the current input address is about to overtake the current output address when the current input address is one less than the current output address, and the comparison logic indicating that the current output address is about to overtake the current input address when the current output address is one less than the current input address.

12. A slip buffer as in claim 1 wherein the slip address means includes comparison logic, the comparison logic comparing the current output address and a corresponding substep of the current input address, the comparison logic indicating that the current input address is about to overtake the current output address when the current input address is equal to the current output address, and the comparison logic indicating that the current output address is about to overtake the current input address when the current output address is one less than the current input address.

13. A slip buffer as in claim 1 wherein when the slip buffer control logic receives a force to boundary signal and the first boundary address and the second boundary address are valid, the slip address generation loads into the output address generating means one of the first boundary address and the second boundary address which is farthest from the current output address.

14. A method for controlling a slip buffer comprising the steps of:

(a) generating, by a first counter, addresses into which data is read into a first-in-first-out memory;

(b) generating, by a second counter, addresses from which data is read from the first-in-first-out memory;

(c) loading a new count into the second counter when a current input address in the first counter is about to overtake a current output address in the second counter, the new count being a full frame ahead of the current output address in the second counter; and, (d) loading a second new output address into the second counter when the current output address is about to overtake the current input address, the second new output address being a full frame behind the current output address in the second counter;

(e) storing a first frame boundary and a first indication which indicates whether the first frame boundary is valid; and, (f) storing a second frame boundary and a second indication which indicates whether the second frame boundary is valid.

15. A method for controlling a slip buffer comprising the following steps:

(a) generating, by a first counter, addresses into which data is read into a first-in-first-out memory;

(b) generating, by a second counter, addresses from which data is read from the first-in-first-out memory;

(c) loading a first new count into the second counter when a current input address in the first counter is about to overtake a current output address in the second counter the first new count being a full frame ahead of the current output address in the second counter;

(d) loading a second new count into the second counter when the current output address is about to overtake the current input address, the second new count being a full frame behind the current output address in the second counter;

(e) storing a first frame boundary in a first latch, including storing a first validity bit which indicates whether the first frame boundary is valid; and, (f) storing a second frame boundary in a second latch including storing a second validity bit which indicates whether the second frame boundary is valid.

16. A method as in claim 15:

wherein in step (c) when the current input address is about to overtake the current output address, and at least one of the first boundary address in the first latch and the second boundary address in the second latch is valid, the first new count is loaded in the second counter when the current output address in the second counter is at a frame boundary; and, wherein in step (d) when the current output address is about to overtake the current input address, and at least one of the first boundary address in the first latch and the second boundary address in the second latch is valid, the second new count is loaded in the second counter when the current output address in the second counter is at a frame boundary.

17. A method as in claim 16:

wherein in step (c) when the current input address is about to overtake the current output address, and both the first boundary address in the first latch and the second boundary address in the second latch are not valid, the first new count is immediately loaded in the second counter; and, wherein in step (d) when the current output address is about to overtake the current input address, and both the first boundary address in the first latch and the second bound address in the second latch are valid, the second new count is immediately loaded in the second counter.

18. A method as in claim 17 wherein the first-in-first-out memory contains two frames of data and wherein in step (c)

and step (d) the first and second new counts are loaded into the second counter by toggling a bit in the current output address in the second counter.

19. A method as in claim 15:

wherein in step (a) the first counter is clocked by an input clock signal; and, wherein in step (b) the second counter is clocked by an output clock signal.

20. A method as in claim 19 additionally comprising the steps of:

(g) generating a frame boundary signal when the first boundary address in the first latch is valid and equals the current output address in the second counter; and, (h) generating the frame boundary signal when the second boundary address in the second latch is valid and equals the current output address in the second counter.

21. A method as in claim 20 additionally comprising the steps of:

(i) storing a third validity bit which indicates whether the first frame boundary is a valid multi-frame boundary;

(j) storing a fourth validity bit which indicates whether the second frame boundary is a valid multiple frame boundary;

(k) generating a multi-frame boundary signal when the first boundary address is a valid multi-frame boundary and equals the current output address in the second counter; and, (l) generating the multi-frame boundary signal when the second boundary address is a valid multi-frame boundary and equals the current output address in the second counter.

22. A method as in claim 15:

wherein in step (c) indicating that the current input address is about to overtake the current output address when the current input address is one less than the current output address; and, wherein in step (d) indicating that the current output address is about to overtake the current input address when the current output address is one less than the current input address.

23. A method as in claim 15 additionally comprising the step of:

(g) when the slip buffer receives a force to boundary signal and the first boundary address and the second boundary address are valid, loading into the second counter one of the first boundary address and the second boundary address which is farthest from the current output address.

24. A method as in claim 15:

wherein in step (c) indicating that the current input address is about to overtake the current output address when the current input address is equal to the current output address; and, wherein in step (d) indicating that the current output address is about to overtake the current input address when the current output address is one less than the current input address.

* * * * *